(12) United States Patent
Yang et al.

(10) Patent No.: US 12,217,503 B2
(45) Date of Patent: Feb. 4, 2025

(54) TIDAL FLAT EXTRACTION METHOD BASED ON HYPERSPECTRAL DATA

(71) Applicant: NINGBO UNIVERSITY, Ningbo (CN)

(72) Inventors: Gang Yang, Ningbo (CN); Weiwei Sun, Ningbo (CN); Chunchen Shao, Ningbo (CN); Xiangchao Meng, Ningbo (CN); Tian Feng, Ningbo (CN)

(73) Assignee: NINGBO UNIVERSITY, Ningbo (CN)

( * ) Notice: Subject to any disclaimer, the term of this patent is extended or adjusted under 35 U.S.C. 154(b) by 0 days.

(21) Appl. No.: 18/808,129

(22) Filed: Aug. 19, 2024

(65) Prior Publication Data

US 2025/0014332 A1     Jan. 9, 2025

Related U.S. Application Data

(63) Continuation of application No. PCT/CN2024/090522, filed on Apr. 29, 2024.

(30) Foreign Application Priority Data

Jul. 4, 2023     (CN) .......................... 202310809318.3

(51) Int. Cl.
*G06V 20/10*     (2022.01)
*G06V 10/22*     (2022.01)
(Continued)

(52) U.S. Cl.
CPC ............ *G06V 20/194* (2022.01); *G06V 10/22* (2022.01); *G06V 10/32* (2022.01); *G06V 10/58* (2022.01)

(58) Field of Classification Search
CPC ...... G06V 20/194; G06V 10/22; G06V 10/32; G06V 10/58
See application file for complete search history.

(56) References Cited

U.S. PATENT DOCUMENTS

| 6,018,587 A | 1/2000 | Cabib |
| 2022/0108430 A1* | 4/2022 | Shi ............................ G06T 5/73 |

FOREIGN PATENT DOCUMENTS

| CN | 111639543 A | 9/2020 |
| CN | 112213287 A | 1/2021 |

(Continued)

OTHER PUBLICATIONS

T. Wu, M. Li, S. Wang, Y. Yang, S. Sang and D. Jia, "Urban Black-Odor Water Remote Sensing Mapping Based on Shadow Removal: A Case Study in Nanjing," in IEEE Journal of Selected Topics in Applied Earth Observations and Remote Sensing, vol. 14 , pp. 9584-9596, 2021, doi: 10.1109/JSTARS.2021.3114355. (Year: 2021).*

*Primary Examiner* — Andrew M Moyer
*Assistant Examiner* — Ahmed A Nasher
(74) *Attorney, Agent, or Firm* — Bayramoglu Law Offices LLC

(57) ABSTRACT

The provided is a tidal flat extraction method based on hyperspectral data. The method includes: acquiring and preprocessing hyperspectral data; calculating a constraint condition; calculating, according to the constraint condition, a normalized difference tidal flat index (NDTFI), generating a sample index statistical box chart, and determining a tidal flat extraction threshold according to the sample index statistical box chart; and removing a misclassified pixel based on a coastal buffer zone and a high spatial resolution image, thereby achieving final extraction of a tidal flat. The method has the following beneficial effects. The method is an effective supplement to the existing tidal flat extraction methods. The method adopts an easily realized process, improves the accuracy of tidal flat extraction, reflects the real spatial distribution of the tidal flat, and provides a scientific basis for tidal flat management and protection.

18 Claims, 3 Drawing Sheets

(51) Int. Cl.
*G06V 10/32* (2022.01)
*G06V 10/58* (2022.01)

(56) References Cited

FOREIGN PATENT DOCUMENTS

| CN | 113538559 A | 10/2021 |
|----|-------------|---------|
| CN | 117036777 A | 11/2023 |

\* cited by examiner

TIDAL FLAT EXTRACTION METHOD BASED ON HYPERSPECTRAL DATA

CROSS-REFERENCE TO THE RELATED APPLICATIONS

This application is a continuation application of International Application No. PCT/CN2024/090522, filed on Apr. 29, 2024, which is based upon and claims priority to Chinese Patent Application No. 202310809318.3, filed on Jul. 4, 2023, the entire contents of which are incorporated herein by reference.

TECHNICAL FIELD

The present disclosure relates to the technical field of remote-sensing image classification and extraction, and in particular to a tidal flat extraction method based on hyperspectral data.

BACKGROUND

Due to the tide, the tidal flat located in the transition zone of sea and land ecology is submerged by sea water at high tide and exposed to the sea at low tide. Tidal flats play an important role in stabilizing the coastline, maintaining ecological balance, and protecting biodiversity due to its unique sea and land characteristics. As an important land reserve, the tidal flat wetlands have great development potential in the development of aquaculture ponds, reclamation, etc., which poses great threats to tidal flats. Accurate and detailed remote-sensing monitoring of tidal flat resources provides an important basis for scientific development of tidal flat resources, and is of great significance for sustainable development of tidal flat resources.

In recent years, as the observation data of coastal wetlands are becoming increasingly stable and abundant, the identification and extraction of tidal flats has become a hot spot for coastal remote-sensing research. The optical image technique has advantages in the monitoring and research of large areas of tidal flats. At present, optical image-based tidal flat extraction methods include visual interpretation, tidal model or terrain-based methods, training sample-based machine learning (ML) methods, and knowledge-based decision tree methods, etc. The commonly used data sources for research are medium-resolution optical remote-sensing data, typically Landsat and Sentinel-2 data. High-resolution remote-sensing data, including data acquired by IKONOS, QuickBird, ZY-3, and GF-1 satellites, as well as drone data, can help improve extraction accuracy. In addition to optical remote-sensing data, radar data are also increasingly applied to tidal flat monitoring.

At present, the commonly used data source in the research of tidal flat extraction is multispectral data, and hyperspectral data is rarely used. Due to the small number of wavebands, the information included in the multispectral data is insufficient to well distinguish a tidal flat from other surface features. Instead, it is easy to cause false extraction, so the extraction results cannot accurately reflect the real spatial distribution of the tidal flat. Hyperspectral data has high spectral resolution and includes tens to hundreds of wavebands, providing rich information for fully reflecting the spectral difference between a tidal flat and other surface features. In China, among the hyperspectral satellites, the GF-5 and ZY1-02D satellites can provide hyperspectral data with high spatial resolution. In view of this, the present disclosure proposes a tidal flat index based on hyperspectral data to effectively supplement the existing tidal flat extraction methods. The present disclosure can improve the accuracy of tidal flat extraction, reflect the real spatial distribution of the tidal flat, and provide a scientific basis for tidal flat management and protection.

SUMMARY

In view of the shortcomings in the prior art, an objective of the present disclosure is to provide a tidal flat extraction method based on hyperspectral data.

A first aspect provides a tidal flat extraction method based on hyperspectral data, including:

S1, acquiring and preprocessing hyperspectral data, where the preprocessing includes radiometric calibration, atmospheric correction, and orthorectification;

S2, calculating a constraint condition, including a first constraint condition w, a second constraint condition v, and a third constraint condition s;

S3, calculating, according to values of the first constraint condition w, the second constraint condition v, and the third constraint condition s, a normalized difference tidal flat index (NDTFI); generating a sample index statistical box chart; and determining a tidal flat extraction threshold according to the sample index statistical box chart; and S4, removing a misclassified pixel based on a coastal buffer zone and a high spatial resolution image, thereby achieving final extraction of a tidal flat.

Preferably, in the step S2, the first constraint condition w is calculated as follows:

$$w = \rho 1274 + \rho 1660 - \rho 1980 + \alpha_1$$

where, $\rho 1274$ denotes a band value with a center wavelength of 1,274 nm, $\rho 1660$ denotes a band value with a center wavelength of 1,660 nm, and $\rho 1980$ denotes a band value with a center wavelength of 1,980 nm; and $\alpha_1$ denotes an offset coefficient of the constraint condition w.

Preferably, in the step S2, the second constraint condition v is calculated as follows:

$$v = (\rho 670 - \rho 979) + (\rho 670 - \rho 1156) + \alpha_2$$

where, $\rho 670$ denotes a band value with a center wavelength of 670 nm, $\rho 979$ denotes a band value with a center wavelength of 979 nm, and $\rho 1156$ denotes a band value with a center wavelength of 1,156 nm; and $\alpha_2$ denotes an offset coefficient of the constraint condition v.

Preferably, in the step S2, the third constraint condition s is calculated as follows:

$$s = \rho 1105 - \rho 1031 + \alpha_3$$

where, $\rho 1031$ denotes a band value with a center wavelength of 1,031 nm, and $\rho 1105$ denotes a band value with a center wavelength of 1,105 nm; and $\alpha_3$ denotes an offset coefficient of the constraint condition s.

Preferably, in the step S3, the NDTFI is calculated as follows:

$$NDTFI = \begin{cases} \dfrac{\rho 816 - \rho 1980}{\rho 816 + \rho 1980} & w > 0, v > 0, s > 0 \\ -\left|\dfrac{\rho 816 - \rho 1980}{\rho 816 + \rho 1980}\right| & w < 0 \text{ or } v < 0 \text{ or } s < 0 \end{cases}$$

where, $\rho 816$ denotes a band value with a center wavelength of 816 nm, and $\rho 1980$ denotes a band value with a center wavelength of 1,980 nm.

Preferably, the step S3 includes: distinguishing the tidal flat from a non-tidal-flat surface feature according to the threshold, where the tidal flat is expressed as follows:

$$\text{NDTFI}(m,n) \geq \min_{tf}$$

where, NDTFI(m,n) denotes the value of NDTFI at a location (m,n), and $\min_{tf}$ denotes a lower limit of a tidal flat extraction threshold.

Preferably, in the step S4, the high spatial resolution image is a sub-meter high spatial resolution image provided by Google Earth Pro for visual comparison.

Preferably, in the step S2, final values of $\alpha_1$, $\alpha_2$, and $\alpha_3$ are determined through sensitivity analysis.

A second aspect provides a tidal flat extraction system based on hyperspectral data, configured to implement the tidal flat extraction method based on hyperspectral data according to any one of the paragraphs in the first aspect, and including:

a preprocessing module, configured to acquire and preprocess the hyperspectral data, where the preprocessing includes radiometric calibration, atmospheric correction, and orthorectification;

a first calculation module, configured to calculate the constraint condition, including the first constraint condition w, the second constraint condition v, and the third constraint condition s;

a second calculation module, configured to calculate, according to the values of the first constraint condition w, the second constraint condition v, and the third constraint condition s, the NDTFI; generate the sample index statistical box chart; and determine the tidal flat extraction threshold according to the sample index statistical box chart; and an extraction module, configured to remove the misclassified pixel based on the coastal buffer zone and the high spatial resolution image, thereby achieving final extraction of the tidal flat.

A third aspect provides a computer storage medium, configured to store a computer program, where when the computer program runs on a computer, the computer performs the tidal flat extraction method based on hyperspectral data according to any one of the paragraphs in the first aspect.

The present disclosure has the following beneficial effects. The present disclosure provides a normalized tidal flat index based on hyperspectral data for distinguishing a tidal flat in coastal areas from other typical surface features. The present disclosure extracts the tidal flat based on a threshold trained according to the index, and removes a mistakenly extracted pixel according to the sub-meter high spatial resolution image to realize fine tidal flat extraction. The method proposed by the present disclosure is an effective supplement to the existing tidal flat extraction methods. The present disclosure adopts an easily realized process, improves the accuracy of tidal flat extraction, reflects the real spatial distribution of the tidal flat, and provides a scientific basis for tidal flat management and protection. Therefore, the method proposed by the present disclosure has important practical significance.

DETAILED DESCRIPTION OF THE EMBODIMENTS

The present disclosure will be further described below with reference to embodiments.

The following description of the embodiments is only for helping to understand the present disclosure. It should be noted that, improvements and modifications may be made by those of ordinary skill in the art without departing from the principle of the present disclosure, but these improvements and modifications should fall within the protection scope defined by the claims of the present disclosure.

Embodiment 1

Figure 1:
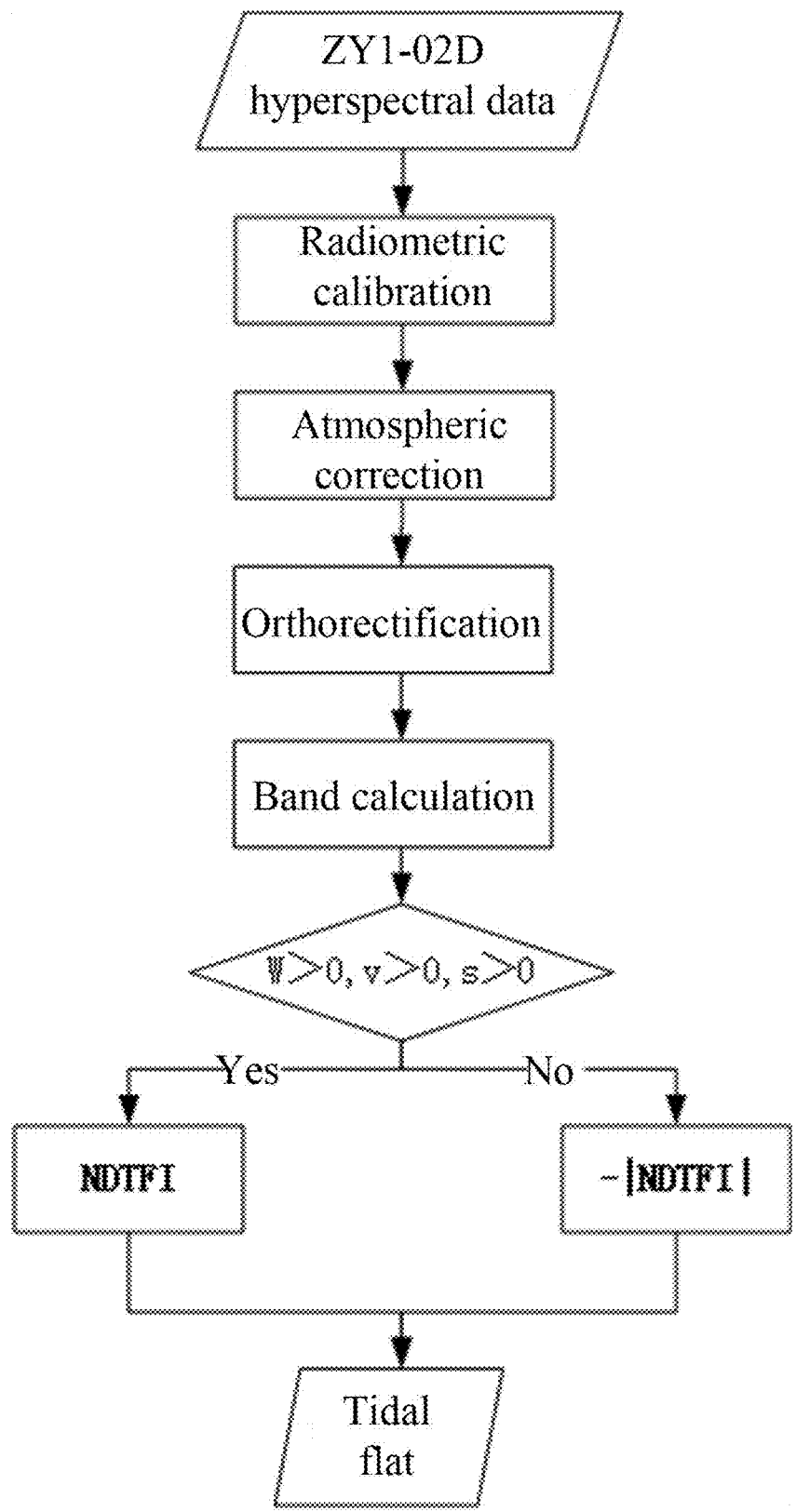
FIG. 1 is a flowchart of a tidal flat extraction method based on hyperspectral data.

An embodiment of the present disclosure provides a tidal flat extraction method based on hyperspectral data, using ZY1-02D hyperspectral data as a data source, and implemented through ENVI5.3 software. As shown in FIG. 1, the method includes the following steps.

S1. Hyperspectral data is acquired and preprocessed, where the preprocessing includes radiometric calibration, atmospheric correction, and orthorectification.

The radiometric calibration, atmospheric correction, and orthorectification are prior art, which will not be elaborated herein.

S2. A constraint condition is calculated, including first constraint condition w, second constraint condition v, and third constraint condition s.

In the step S2, the constraint conditions w, v, and s are calculated respectively through Band Math in ENVI as follows.

$$w = \rho1274 + \rho1660 - \rho1980 + \alpha_1$$

where, ρ1274 denotes a band value with a center wavelength of 1,274 nm (i.e. a band value of SW data Band17 in a ZY1-02D image), ρ1660 denotes a band value with a center wavelength of 1,660 nm (i.e. a band value of SW data Band40 in the ZY1-02D image), and ρ1980 denotes a band value with a center wavelength of 1,980 nm (i.e. a band value of SW data Band59 in the ZY1-02D image). In addition, in this embodiment, $\alpha_1$ is −0.1.

$$v = (\rho670 - \rho979) + (\rho670 - \rho1156) + \alpha_2$$

where, ρ670 denotes a band value with a center wavelength of 670 nm (i.e. a band value of VN data Band33 in the ZY1-02D image), ρ979 denotes a band value with a center wavelength of 979 nm (i.e. a band value of VN data Band69 in the ZY1-02D image), and ρ1156 denotes a band value with a center wavelength of 1,156 nm (i.e. a band value of SW data Band10 in the ZY1-02D image). In addition, in this embodiment, $\alpha_2$ is 0.1.

$$s = \rho1105 - \rho1031 + \alpha_3$$

where, ρ1031 denotes a band value with a center wavelength of 1,031 nm (i.e. a band value of VN data Band75 in the ZY1-02D image), and ρ1105 denotes a band value with a center wavelength of 1,105 nm (i.e. a band value of SW data Band7 in the ZY1-02D image). In addition, in this embodiment, $\alpha_3$ is 0.04. It should be noted that, final values of $\alpha_1$, $\alpha_2$, and $\alpha_3$ are determined through sensitivity analysis, fully taking into account the differences in spectral characteristics between the tidal flat and other typical surface features in the coastal area.

Figure 2:
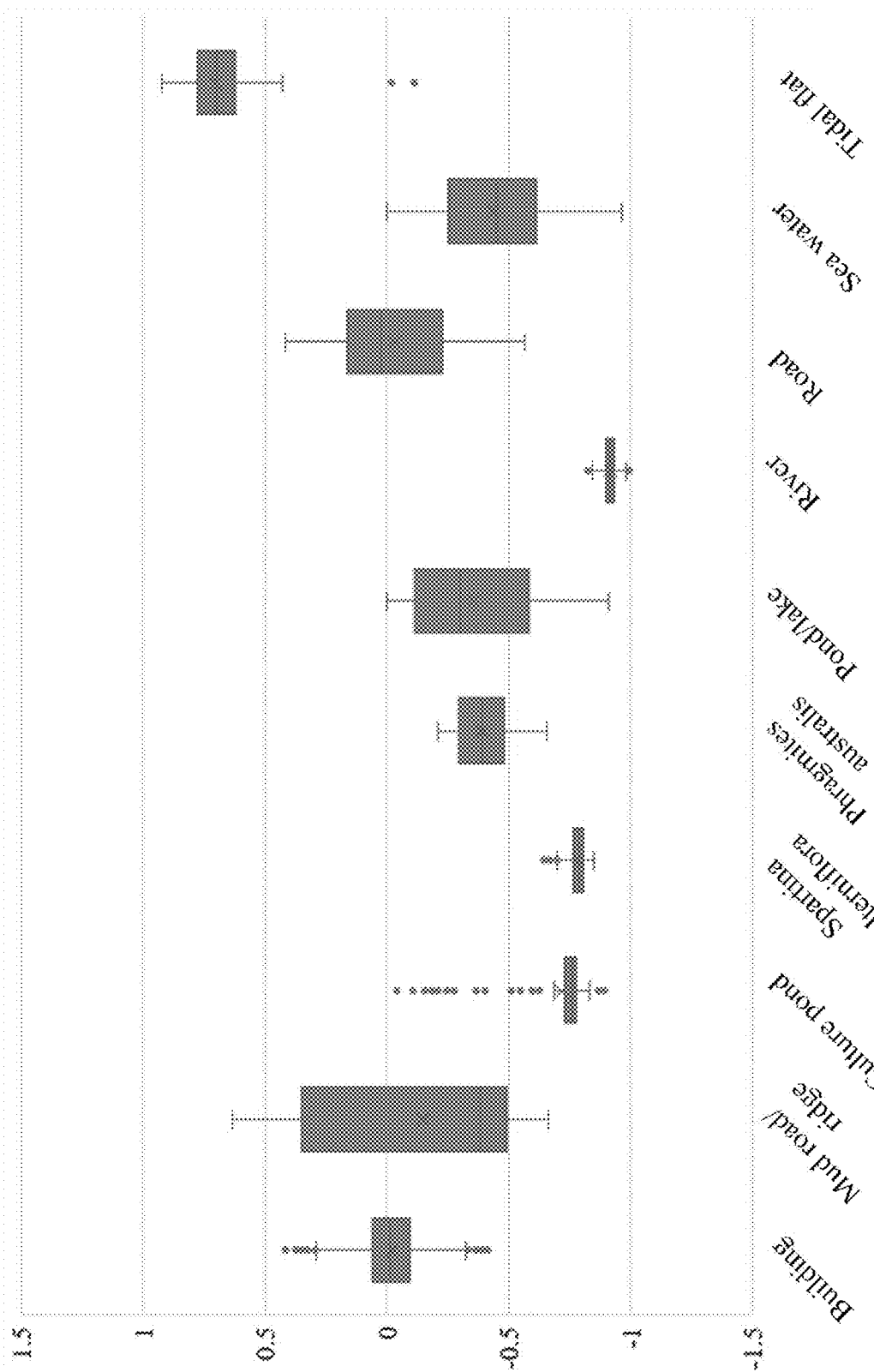
FIG. 2 is a box chart generated based on normalized difference tidal flat index (NDTFI) calculation results of various samples.

S3. According to values of the first constraint condition w, the second constraint condition v, and the third constraint condition s, a NDTFI is calculated. As shown in FIG. 2, a sample index statistical box chart is generated, and a tidal flat extraction threshold is determined according to the sample index statistical box chart.

In the step S3, the NDTFI is calculated as follows:

$$NDTFI = \frac{\rho 816 - \rho 1980}{\rho 816 + \rho 1980} w > 0, v > 0, s > 0$$

where, ρ816 denotes a band value with a center wavelength of 816 nm (i.e. a band value of VN data Band50 in the ZY1-02D image), and ρ1980 denotes a band value with a center wavelength of 1,980 nm (i.e. a band value of SW data Band59 in the ZY1-02D image).

Further, the tidal flat is distinguished from a non-tidal-flat surface feature according to the threshold, where the tidal flat is expressed as follows:

NDTFI(m,n)≥0.43 where, NDTFI(m,n) denotes the value of NDTFI at location (m,n), and according to calculation and statistics, a lower limit of the tidal flat index threshold is 0.43. If the NDTFI at the location (m,n) meets the above equation, then the pixels in the area where location (m,n) is located are judged to belong to the tidal flat, otherwise the area is judged not to belong to the tidal flat. S4. A misclassified pixel is removed based on a coastal buffer zone and a high spatial resolution image, thereby achieving final extraction of the tidal flat.

In the step S4, the high spatial resolution image is a sub-meter high spatial resolution image provided by Google Earth Pro for visual comparison.

Figure 3:
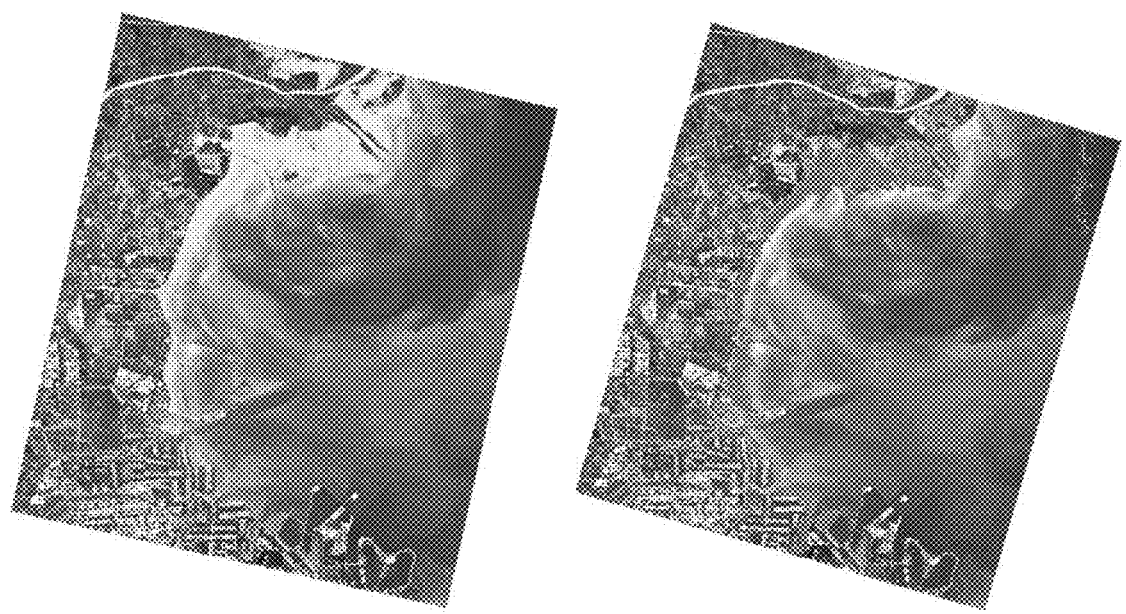
FIG. 3 shows a tidal flat extraction result.

FIG. 3 shows an extraction result of a coastal tidal flat in this embodiment. According to the index proposed by the present disclosure, the coastal tidal flat at the Yellow River estuary/Laizhou Bay in China was simply, quickly and accurately extracted, and most of the pixels of other misclassified surface features were removed, well reflecting the real spatial distribution of the coastal tidal flat, and being conducive to the monitoring and management of the coastal tidal flat.

Embodiment 2

Based on Embodiment 1, Embodiment 2 of the present disclosure provides another tidal flat extraction method based on hyperspectral data, including the following steps.

S1. Hyperspectral data is acquired and preprocessed, where the preprocessing includes radiometric calibration, atmospheric correction, and orthorectification.

S2. A constraint condition is calculated, including first constraint condition w, second constraint condition v, and third constraint condition s.

S3. According to values of the first constraint condition w, the second constraint condition v, and the third constraint condition s, a NDTFI is calculated. A sample index statistical box chart is generated, and a tidal flat extraction threshold is determined according to the sample index statistical box chart.

In the step S3, the NDTFI is calculated as follows:

$$NDTFI = -\left|\frac{\rho 816 - \rho 1980}{\rho 816 + \rho 1980}\right| w < 0 \text{ or } v < 0 \text{ or } s < 0$$

S4. A misclassified pixel is removed based on a coastal buffer zone and a high spatial resolution image, thereby achieving final extraction of a tidal flat.

It should be noted that the same or similar parts between this embodiment and Embodiment 1 may refer to each other and will not be elaborated herein.

Embodiment 3

Based on Embodiment 1, Embodiment 3 of the present disclosure provides a tidal flat extraction system based on hyperspectral data, including the following modules.

A preprocessing module is configured to acquire and preprocess the hyperspectral data, where the preprocessing includes radiometric calibration, atmospheric correction, and orthorectification.

A first calculation module is configured to calculate the constraint condition, including the first constraint condition w, the second constraint condition v, and the third constraint condition s.

A second calculation module is configured to calculate, according to the values of the first constraint condition w, the second constraint condition v, and the third constraint condition s, the NDTFI; generate the sample index statistical box chart; and determine the tidal flat extraction threshold according to the sample index statistical box chart.

An extraction module is configured to remove the misclassified pixel based on the coastal buffer zone and the high spatial resolution image, thereby achieving final extraction of the tidal flat.

Specifically, the system provided by this embodiment is corresponding to the method provided by Embodiment 1. Therefore, the same or similar parts between this embodiment and Embodiment 1 may refer to each other and will not be elaborated herein.

In conclusion, the present disclosure proposes a tidal flat extraction index based on hyperspectral remote-sensing image. The present disclosure makes full use of the advantages of "image and spectrum fusion" of hyperspectral data, realizes simple, fast and accurate extraction of the tidal flat, simplifies the difficulty and process of tidal flat extraction, and has obvious advantages over traditional classification methods.

The invention claimed is:

1. A tidal flat extraction method based on hyperspectral data, comprising:
S1, acquiring and preprocessing hyperspectral data, wherein the preprocessing comprises radiometric calibration, atmospheric correction, and orthorectification;
S2, calculating a constraint condition, comprising a first constraint condition w, a second constraint condition v, and a third constraint condition s;
S3, calculating, according to values of the first constraint condition w, the second constraint condition v, and the third constraint condition s, a normalized difference tidal flat index (NDTFI); generating a sample index statistical box chart; and determining a tidal flat extraction threshold according to the sample index statistical box chart; and
S4, removing a misclassified pixel based on a coastal buffer zone and a high spatial resolution image, thereby achieving final extraction of a tidal flat,
wherein in the step S2, the first constraint condition w is calculated as follows:

$$w = \rho 1274 + \rho 1660 - \rho 1980 + \alpha_1$$

wherein ρ1274 denotes a band value with a center wavelength of 1,274 nm, ρ1660 denotes a band value with a center wavelength of 1.660 nm, and ρ1980 denotes a band value with a center wavelength of 1,980 nm; and $\alpha_1$ denotes an offset coefficient of the first constraint condition w.

2. The tidal flat extraction method based on the hyperspectral data according to claim 1, wherein in the step S2, the second constraint condition v is calculated as follows:

$$v=(\rho670-\rho979)+(\rho670-\rho1156)+\alpha_2$$

wherein ρ670 denotes a band value with a center wavelength of 670 nm, ρ979 denotes a band value with a center wavelength of 979 nm, and ρ1156 denotes a band value with a center wavelength of 1,156 nm; and $\alpha_2$ denotes an offset coefficient of the second constraint condition v.

3. The tidal flat extraction method based on the hyperspectral data according to claim 2, wherein in the step S2, the third constraint condition s is calculated as follows:

$$s=\rho1105-\rho1031+\alpha_3$$

wherein ρ1031 denotes a band value with a center wavelength of 1,031 nm, and ρ1105 denotes a band value with a center wavelength of 1,105 nm; and $\alpha_3$ denotes an offset coefficient of the third constraint condition s.

4. The tidal flat extraction method based on the hyperspectral data according to claim 3, wherein in the step S3, the NDTFI is calculated as follows:

$$NDTFI = \begin{cases} \dfrac{\rho816 - \rho1980}{\rho816 + \rho1980} & w>0, v>0, s>0 \\ -\left|\dfrac{\rho816 - \rho1980}{\rho816 + \rho1980}\right| & w<0 \text{ or } v<0 \text{ or } s<0 \end{cases}$$

wherein ρ816 denotes a band value with a center wavelength of 816 nm, and ρ1980 denotes a band value with a center wavelength of 1,980 nm.

5. The tidal flat extraction method based on the hyperspectral data according to claim 4, wherein the step S3 comprises: distinguishing the tidal flat from a non-tidal-flat surface feature according to the tidal flat extraction threshold, wherein the tidal flat is expressed as follows:

$$NDTFI(m,n) \geq \min_{tf}$$

wherein NDTFI(m,n) denotes the value of NDTFI at a location (m,n), and mint denotes a lower limit of the tidal flat extraction threshold.

6. The tidal flat extraction method based on the hyperspectral data according to claim 5, wherein in the step S4, the high spatial resolution image is a sub-meter high spatial resolution image provided for visual comparison.

7. The tidal flat extraction method based on the hyperspectral data according to claim 6, wherein in the step S2, final values of $\alpha_1$, $\alpha_2$, and $\alpha_3$ are determined through sensitivity analysis.

8. A tidal flat extraction system based on hyperspectral data, configured to implement the tidal flat extraction method based on the hyperspectral data according to claim 1, and comprising:

a preprocessing module, configured to acquire and preprocess the hyperspectral data, wherein the preprocessing comprises the radiometric calibration, the atmospheric correction, and the orthorectification;

a first calculation module, configured to calculate the constraint condition, comprising the first constraint condition w, the second constraint condition v, and the third constraint condition s;

a second calculation module, configured to calculate, according to the values of the first constraint condition w, the second constraint condition v, and the third constraint condition s, the NDTFI; generate the sample index statistical box chart; and determine the tidal flat extraction threshold according to the sample index statistical box chart; and an extraction module, configured to remove the misclassified pixel based on the coastal buffer zone and the high spatial resolution image, thereby achieving the final extraction of the tidal flat.

9. A non-transitory computer storage medium, configured to store a computer program, wherein when the computer program runs on a computer, the computer performs the tidal flat extraction method based on the hyperspectral data according to claim 1.

10. The tidal flat extraction system according to claim 8, wherein in the step S2 of the tidal flat extraction method, the second constraint condition v is calculated as follows:

$$v=(\rho670-\rho979)+(\rho670-\rho1156)+\alpha_2$$

wherein ρ670 denotes a band value with a center wavelength of 670 nm, ρ979 denotes a band value with a center wavelength of 979 nm, and ρ1156 denotes a band value with a center wavelength of 1,156 nm; and $\alpha_2$ denotes an offset coefficient of the second constraint condition v.

11. The tidal flat extraction system according to claim 10, wherein in the step S2 of the tidal flat extraction method, the third constraint condition s is calculated as follows:

$$s=\rho1105-\rho1031+\alpha_3$$

wherein ρ1031 denotes a band value with a center wavelength of 1,031 nm, and ρ1105 denotes a band value with a center wavelength of 1,105 nm; and $\alpha_3$ denotes an offset coefficient of the third constraint condition s.

12. The tidal flat extraction system according to claim 11, wherein in the step S3 of the tidal flat extraction method, the NDTFI is calculated as follows:

$$NDTFI = \begin{cases} \dfrac{\rho816 - \rho1980}{\rho816 + \rho1980} & w>0, v>0, s>0 \\ -\left|\dfrac{\rho816 - \rho1980}{\rho816 + \rho1980}\right| & w<0 \text{ or } v<0 \text{ or } s<0 \end{cases}$$

wherein ρ816 denotes a band value with a center wavelength of 816 nm, and ρ1980 denotes a band value with a center wavelength of 1,980 nm.

13. The tidal flat extraction system according to claim 12, wherein the step S3 of the tidal flat extraction method comprises: distinguishing the tidal flat from a non-tidal-flat surface feature according to the tidal flat extraction threshold, wherein the tidal flat is expressed as follows:

$$NDTFI(m,n) \geq \min_{tf}$$

wherein NDTFI(m,n) denotes the value of NDTFI at a location (m,n), and mint denotes a lower limit of the tidal flat extraction threshold.

14. The tidal flat extraction system according to claim 13, wherein in the step S4 of the tidal flat extraction method, the high spatial resolution image is a sub-meter high spatial resolution image provided for visual comparison.

15. The tidal flat extraction system according to claim 14, wherein in the step S2 of the tidal flat extraction method, final values of $\alpha_1$, $\alpha_2$, and $\alpha_3$ are determined through sensitivity analysis.

16. The non-transitory computer storage medium according to claim 9, wherein in the step S2 of the tidal flat extraction method, the first constraint condition w is calculated as follows:

$$w = \rho 1274 + \rho 1660 - \rho 1980 + \alpha_1$$

wherein $\rho 1274$ denotes a band value with a center wavelength of 1,274 nm, $\rho 1660$ denotes a band value with a center wavelength of 1,660 nm, and $\rho 1980$ denotes a band value with a center wavelength of 1,980 nm; and $\alpha_1$ denotes an offset coefficient of the first constraint condition w.

17. The non-transitory computer storage medium according to claim 16, wherein in the step S2 of the tidal flat extraction method, the second constraint condition v is calculated as follows:

$$v = (\rho 670 - \rho 979) + (\rho 670 - \rho 1156) + \alpha_2$$

wherein $\rho 670$ denotes a band value with a center wavelength of 670 nm, $\rho 979$ denotes a band value with a center wavelength of 979 nm, and $\rho 1156$ denotes a band value with a center wavelength of 1,156 nm; and $\alpha_2$ denotes an offset coefficient of the second constraint condition v.

18. The non-transitory computer storage medium according to claim 17, wherein in the step S2 of the tidal flat extraction method, the third constraint condition s is calculated as follows:

$$s = \rho 1105 - \rho 1031 + \alpha_3$$

wherein $\rho 1031$ denotes a band value with a center wavelength of 1,031 nm, and $\rho 1105$ denotes a band value with a center wavelength of 1,105 nm; and $\alpha_3$ denotes an offset coefficient of the third constraint condition s.

* * * * *